United States Patent
Heinrichs-Bartscher et al.

(10) Patent No.: US 8,868,326 B2
(45) Date of Patent: Oct. 21, 2014

(54) METHOD FOR DETECTING CRITICAL DRIVING SITUATIONS OF LORRIES OR PASSENGER VEHICLES AND METHOD FOR AVOIDING COLLISIONS

(75) Inventors: Sascha Heinrichs-Bartscher, Neuwied (DE); Christian Stelzer, Neuhäusel (DE)

(73) Assignee: Lucas Automotive GmbH, Koblenz (DE)

(*) Notice: Subject to any disclaimer, the term of this patent is extended or adjusted under 35 U.S.C. 154(b) by 0 days.

(21) Appl. No.: 13/884,683

(22) PCT Filed: Nov. 8, 2011

(86) PCT No.: PCT/EP2011/005611
§ 371 (c)(1),
(2), (4) Date: Aug. 30, 2013

(87) PCT Pub. No.: WO2012/062451
PCT Pub. Date: May 18, 2012

(65) Prior Publication Data
US 2014/0052355 A1    Feb. 20, 2014

(30) Foreign Application Priority Data

Nov. 12, 2010 (DE) .......................... 10 2010 051 203

(51) Int. Cl.
G08G 1/16 (2006.01)
B60W 30/095 (2012.01)
B60T 7/22 (2006.01)
B60W 50/00 (2006.01)

(52) U.S. Cl.
CPC ........... *G08G 1/166* (2013.01); *B60W 30/0956* (2013.01); *B60W 2520/105* (2013.01); *B60T 7/22* (2013.01); *B60W 2550/302* (2013.01);
(Continued)

(58) Field of Classification Search
CPC .......... B60T 8/1755; B60T 7/12; B60T 7/22; B60T 2201/022; B60W 10/184; B60W 30/0953; B60W 2550/308; G01S 13/931; G08G 1/16
USPC ............................................ 701/70, 300–302
See application file for complete search history.

(56) References Cited

U.S. PATENT DOCUMENTS 5,278,764 A    1/1994 Itzuka et al.
5,684,473 A    11/1997 Hibino et al.
(Continued)

FOREIGN PATENT DOCUMENTS

DE    4101759 A1    8/1991
DE    4401416 A1    7/1995
(Continued)

*Primary Examiner* — Mary Cheung
*Assistant Examiner* — Rodney Butler
(74) *Attorney, Agent, or Firm* — MacMillan, Sobanski & Todd, LLC

(57) ABSTRACT

A method for detecting critical driving situations of motor vehicles, in particular for preventing collisions with an object in front of an own vehicle, has the following steps: detection of a current vehicle acceleration and a current vehicle velocity of an own vehicle; specification of an acceleration profile depending on driving variables of the own vehicle; assumption of a time progression of a foreseeable acceleration of the own vehicle based on its current acceleration; determination of a path profile of the own vehicle from the time progression of the foreseeable acceleration; acquisition of a current distance and a current relative velocity of an object in front of the own vehicle; calculation of the current absolute velocity of the object as well as of the absolute current acceleration of the object; assumption of a time progression of a foreseeable acceleration of the object based on its current acceleration; determination of a path profile of the object from the time progression of the foreseeable acceleration; comparison of the path profile of the own vehicle with the path profile of the object; and if the two path profiles intersect, determination of a probable collision time of the own vehicle with the object; establishment of a time before the probable collision time; comparison of this time with the probable collision time determined; and if the probable collision time lies before the established time, issue of a warning to the driver of the own vehicle.

16 Claims, 6 Drawing Sheets

(52) U.S. Cl.
CPC ...... *B60T 2201/022* (2013.01); *B60W 50/0097* (2013.01); *Y02T 10/84* (2013.01); *B60W 2520/10* (2013.01); *B60T 2201/02* (2013.01); *B60W 2550/308* (2013.01); *B60W 30/0953* (2013.01)
USPC ............................................ 701/301; 701/70

(56) References Cited

U.S. PATENT DOCUMENTS

| | | |
|---|---|---|
| 6,292,753 B1 | 9/2001 | Sugimoto et al. |
| 6,294,987 B1 | 9/2001 | Matsuda et al. |
| 7,002,452 B2 | 2/2006 | Watanabe et al. |
| 7,259,661 B2 | 8/2007 | Kitterer et al. |
| 7,425,043 B2 | 9/2008 | Doerr et al. |
| 8,155,853 B2 | 4/2012 | Wang |
| 2012/0101713 A1* | 4/2012 | Moshchuk et al. ........... 701/301 |

FOREIGN PATENT DOCUMENTS

| | | |
|---|---|---|
| DE | 19510910 A1 | 9/1995 |
| DE | 19921238 A1 | 11/1999 |
| DE | 102005014803 A1 | 10/2006 |
| DE | 102005054064 A1 | 5/2007 |
| DE | 102006043676 A1 | 3/2008 |
| DE | 102006046697 A1 | 4/2008 |
| EP | 1559607 A1 | 8/2005 |
| WO | 9942347 A1 | 8/1999 |
| WO | 0243029 A1 | 5/2002 |
| WO | 2004028847 A1 | 4/2004 |
| WO | 2009158223 A2 | 12/2009 |

\* cited by examiner

Consideration of current distance $dist_{AKT,V}$ between the own vehicle and the vehicle in front Path profile of own vehicle and path profile of vehicle in front are superposed and the possible intersection point $T_K$ with $T_{VOR}$ is determined Fig. 8
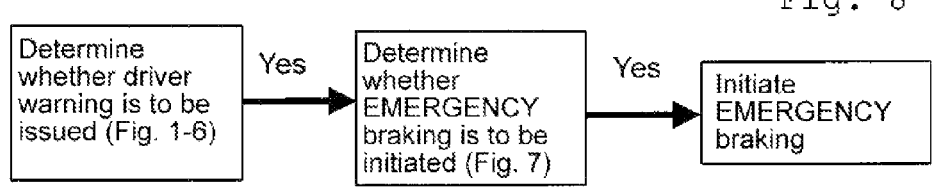
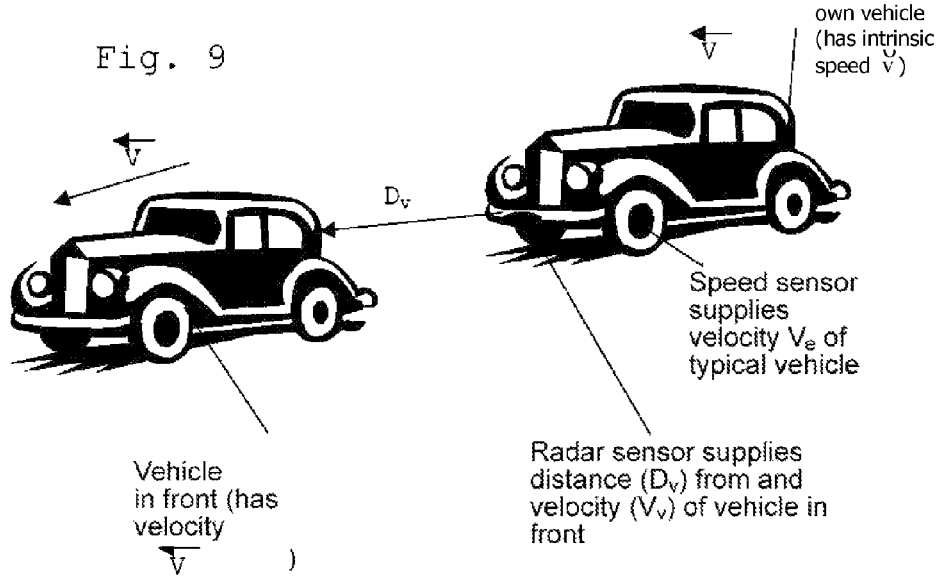
Fig. 9

METHOD FOR DETECTING CRITICAL DRIVING SITUATIONS OF LORRIES OR PASSENGER VEHICLES AND METHOD FOR AVOIDING COLLISIONS

CROSS-REFERENCE TO RELATED APPLICATIONS

This application is a national stage of International Application No. PCT/EP2011/005611 filed Nov. 8, 2011, the disclosures of which are incorporated herein by reference in entirety, and which claimed priority to German Patent Application No. DE 10 2010 051 203.6 filed Nov. 12, 2010, the disclosures of which are incorporated herein by reference in entirety.

BACKGROUND OF THE INVENTION

A method and a system for detecting critical driving situations of lorries or passenger vehicles serves in particular in the manner described below to prevent (rear-end) collisions between the own vehicle and a vehicle in front. This method can work without involving a predetermined emergency braking deceleration.

The printed publication DE 41 01 759 A1, and corresponding U.S. Pat. No. 5,278,764 A, both of which are incorporated herein by reference in entirety, show an automatic vehicle brake system with a velocity sensor for establishing the vehicle velocity and a distance sensor for establishing the distance between the vehicle and a vehicle in front. On the basis of the relative velocity and the distance from the vehicle in front, the brake system determines a limit time that is required until the vehicle collides with the vehicle in front, in order to give the driver of the vehicle an alarm signal by actuation of an alarm device if the limit time becomes shorter than a limit time threshold value if the brake pedal is not depressed. If the driver of the vehicle does not depress the brake pedal on delivery of the alarm signal, then following the expiry of a time interval, an automatic braking process is executed to reduce the vehicle velocity to prevent a collision with the vehicle in front to the extent that the limit time is once again greater than the limit time threshold value.

If the limit time threshold value is too short, it is not always possible to avoid colliding with the vehicle in front in the automatic braking process. Exclusive consideration of the limit time up to collision is not sufficient, to be precise. A required overall stopping distance of the vehicle is determined in addition, therefore, from the vehicle velocity and the friction coefficient between the road surface and the vehicle tyres. If the limit time is greater than the specified limit time threshold value, but the distance between the vehicle and the vehicle in front is smaller than the overall stopping distance determined, then the automatic braking process of the vehicle is likewise executed following delivery of the alarm signal, and to be precise until the distance is once again greater than the currently determined overall stopping distance.

To determine the limit time and the overall stopping distance, driving and/or traffic situations are only registered here in simplified form. In complex traffic situations, a risk of colliding with the vehicle in front is possibly not detected or is incorrectly assessed, therefore. The delivery of the alarm signal and if applicable the automatic braking process can therefore be initiated too early, too late, not at all or unnecessarily.

The printed publication WO 2004 028847 A1, and corresponding U.S. Pat. No. 7,425,043 B2, both of which are incorporated herein by reference in entirety, describe a method and a device for triggering an automatic emergency braking process of a vehicle, especially a heavy goods vehicle, to offer an assistance function for preventing a vehicle from colliding with a vehicle in front or to reduce the accident consequences if a collision is unavoidable. A driver warning is triggered if a specified warning condition is fulfilled. If the warning condition is present, based on the momentary driving situation of the vehicle and a specified emergency braking deceleration, the automatic emergency braking process is to be triggered on expiry of a specified warning time duration to avoid a collision of the vehicle with the vehicle in front. Thus on completion of the automatic emergency braking process, a specified target relative velocity or a target safety distance between the vehicle and the vehicle in front should be attained. The momentary driving situation is obtained in this case from the established acceleration of the vehicle and the established relative acceleration between the vehicle and the vehicle in front. These variables should enable the risk of a collision of the vehicle with the vehicle in front to be detected securely in many complex driving situations.

The specified emergency braking deceleration is one of five cumulative criteria in all here, the presence of which is tested for triggering a driver warning. The automatic emergency braking process is only triggered following the triggering of a driver warning and subsequent expiry of a specified warning time duration. The driver warning is to be triggered when a specified warning condition is fulfilled, included in which are (i) the driving situation of the vehicle that is determined taking the established acceleration of the vehicle into account, (ii) a specified emergency braking deceleration, (iii) a specified target safety distance, and (iv) a specified target relative velocity between the vehicle and the vehicle in front, as target conditions that are to be achieved on completion of the automatic emergency braking process, and (v) the established relative acceleration currently existing between the vehicle and the vehicle in front.

Early detection of critical driving situations by suitable evaluation of a sensor arrangement supplying appropriate raw data makes it possible in a critical situation to emit driver warnings (e.g. acoustic, optical, haptic . . . ) and to precondition the vehicle to support the driver in a critical situation (e.g. influencing of a braking assistant, prefilling of the braking system, . . . ).

DE 44 01 416 A1, and corresponding Great Britain Patent No. 2285876 A, both of which are incorporated herein by reference in entirety, refer to a gradually driving style classification between a steady driving style and a dynamic driving style, in which during driving measurement variables which are indicative of driving styles are sensed by vehicle sensors. At least one driving-style code number is determined by means of at least some of the detected measured values using a respectively associated measurement variable/driving-style characteristic diagram which has been stored in advance. An acceleration code number relating to the acceleration behaviour, a braking code number relating to the braking behaviour and a steering code number relating to the steering behaviour are determined separately by which the input parameters of open-loop or closed-loop control devices of different driving-style-adaptive open-loop or closed-loop control systems of a vehicle are adjustable in the dependency, specifically specified for the respective open-loop or closed-loop control device, of the code numbers.

DE 19 510 910 A1, and corresponding U.S. Pat. No. 5,684,473 A, both of which are incorporated herein by reference in entirety, refer to a measuring apparatus for detecting a distance or a space between vehicles running in the same direction and judging whether or not a predetermined safe distance is kept there between. A related warning system generates an alarm when an actual distance between two vehicles is shorter than the predetermined safe distance. The measuring apparatus has a first means for keeping a "personal space" corresponding to the vehicle speed of a vehicle equipped with the measurement apparatus to detect an accurate and reliable measuring apparatus capable of detecting a safe inter-vehicle distance peculiar to each driver by taking account of individual drivers' senses and physical abilities. The "personal space" is a distance, which is considered as alarming or insufficient by the driver. A second means obtains a free running distance, which the vehicle covers during a response time, based on the response time to the driver's braking operation and a relative speed between a preceding vehicle and the measuring apparatus equipped vehicle/own vehicle. A third means obtains a braking distance on the basis of a depressing strength of a braking pedal in the driver's braking operation and the relative speed. A fourth means obtains a reference distance on the basis of the personal space obtained by the first means, the free running distance obtained by the second means, and the braking distance obtained by the third means. A fifth means decides whether an actual distance between the preceding vehicle and the measuring apparatus equipped vehicle is less than the reference distance obtained by the fourth means.

DE 19 921 238 A1, and corresponding U.S. Pat. No. 6,294, 987 B1, both of which are incorporated herein by reference in entirety, relate to a vehicle safety running control system, which predicts or anticipates the possible decelerations of an obstacle present ahead of the vehicle to conduct contact avoidance control using the predicted decelerations. This system should have the capability to predict or to anticipate, in plural values, possible decelerations generated by an obstacle such as another vehicle running ahead of the subject vehicle. From the predicted decelerations, the obstacle avoidance control should be performed, thereby making the control relatively simple, while enabling the control to be well matched to the driver's expectations.

Therefore, an obstacle present ahead on a course of travel of the subject vehicle is detected. Parameters indicative of motion of the vehicle including at least speed of the vehicle are detected. The condition of the obstacle relative to the vehicle is detected. It will be determined whether at least one of alarming and contact avoidance with the obstacle should be operated. A plurality of decelerations which the obstacle could generate is predicted based on the detected parameters (in particular the detected speed of the vehicle, when the subject vehicle runs under no constant acceleration) and the detected relative condition. Based on at least the predicted decelerations it will be determined whether at least one of alarming and contact avoidance with the obstacle should be operated.

DE 10 2005 014 803 A1 relates to a control of a collision avoiding system to duly warn the driver, if, for instance, the distance between its vehicle and an obstacle becomes too small. Depending on a relative speed between the vehicle and the obstacle, the system calculates a minimum distance between the vehicle and the obstacle within which the vehicle had to stop to avoid collisions. The minimum distance corresponds to a minimum collision avoiding time. In case the minimum collision avoiding time falls below a predetermined threshold value, the system outputs a warning. The system is adaptively designed to distinguish, whether the driver dares a more dynamic way of driving, wherein superfluous warning signals are perceived as disturbing, or whether the drivers prefers a more contemplative way of driving and, hence, prefers an early warning to be able to duly evade the obstacle without a too abrupt change of one or more driving parameters, in case he approaches an obstacle. Based on the reaction of the drive in response to a first warning, the threshold for the generation of the signals is adapted in such a manner that future warning only takes place, in case they are necessary for the individual driver. For this purpose, an obstacle distance between the vehicle and an obstacle is detected by means of a periphery sensor. From the obstacle distance and a relative speed of the vehicle with respect to the obstacle a minimum collision avoiding time is determined. A first warning signal is output, in case the minimum collision avoiding time falls below a first threshold value. A driver's reaction is detected and the first threshold value is adapted based on the duration between the signal and the reaction.

DE 10 2005 054 064 relates to a method for avoiding collision of a vehicle with obstacles located on the lane of the vehicle as well as to a warning device to minimize the frequency of false actuations. To avoid a collision of a vehicle with a potential obstacle located on the lane of the vehicle, an open route of the vehicle is determined by means of detecting the distance between the vehicle and the obstacle; the length of a route covered by the vehicle during a full braking until the vehicle stops is calculated as a braking distance; and a collision warning and/or a brake intervention is initiated based on the determined open route and the calculated braking distance. The calculation of the braking distance is based on the analysis of equations of motion, which in turn are based on the assumption of a time-dependent hypothetic acceleration profile, which approximately represents the time course of the acceleration of the vehicle, which is expected, in case a full braking would be initiated for the present point in time. For this purpose, the acceleration and the acceleration gradient of the vehicle are continuously determined and the hypothetic acceleration profile is defined based on the present acceleration and the present acceleration gradient. The hypothetic acceleration profile could be approximated by means of multiple linear sections.

For calculating the braking distance, a time presumably required for stopping the vehicle is calculated based on a velocity profile corresponding to the hypothetic acceleration profile and a route covered during this time is calculated based on a route length profile corresponding to the hypothetic acceleration profile.

A collision warning or a brake intervention is initiated based on a defined distance threshold, in case the open route is less than the calculated brake distance plus the distance threshold. The distance threshold could be equal to a reaction distance, which corresponds to the length of a route covered by the vehicle during a predetermined driver reaction time, wherein the driver reaction time could be predetermined based on the present state of the accelerator pedal and the brake pedal of the vehicle.

In addition, a collision warning or a brake intervention could only be initiated, in case the vehicle is on reverse drive, the open route is greater than a predetermined threshold, or the driving speed is greater than a predetermined speed threshold. The warning device could be part of a parking assist system for supporting the driver with parking.

DE 10 2006 043 676 relates to a driver assist system (for instance lane-departure-warning-system or collision-warning-system) having a warning function, which alerts the driver to dangerous traffic situations. Using common warning systems of such sort, it is frequently impossible to evaluate the traffic situation by means of the available sensors with the required precision. This quite frequently results in disturbing false warnings. To avoid false warnings, the driving dynamics of the vehicle and the driver's actions or the driver's reactions embodied therein are evaluated as information about the driver's attentiveness. Stronger longitudinal accelerations or lateral accelerations, which are outside a comfort zone, are graded as significant indication for an increased driver's attentiveness, in case they correlate to a dangerous situation detected by the assist system. Fluctuations of the longitudinal accelerations or lateral accelerations, which are outside a comfort zone are graded as high attentiveness of the driver and a warning is suppressed in a situation, in which commonly a warning signal would have been output. In this manner the frequency of false warnings could be significantly reduced and for this reason the acceptance of the warning systems could be increased.

DE 10 2006 046 697 relates to the immediate recognition of dangerous situations within road intersection to warn the concerned road users as soon as there is a risk of conflicts or collisions. Therefore, position data of road users present in the intersection are acquired and evaluated to generate a prognosis of the predicted paths of movement of the road users and to determine based on the prognosis whether conflicts or collisions between the road users impend, for the prevention of which countermeasures are taken. Speed and acceleration data of the road users are factored into the position data. For vehicles, a lane of the vehicle in the intersection is determined based on the position data, wherein turning movements (deutsch: Abbiegebeziehungen) of the vehicle are considered by evaluating, to the extent available, additional data of the vehicle. For each road user, own trajectories are determined and their points of intersections are determined, which represent possible conflict points. In case conflict points exist, countermeasures and in particular a warning of the concerned road user are initiated. The conflict points are calculated in consideration of possible brake actions or acceleration actions of the road users.

EP 1 559 607 A1, and corresponding U.S. Pat. No. 7,259, 661 B2, both of which are incorporated herein by reference in entirety, relate to collision warning for a vehicle, which is equipped with a distance sensor, and which is suited to generate a reliable warning signal for the driver, in case it is likely that a remaining distance to the vehicle traveling ahead could not be maintained at the end of an ACC-brake application or after a driver brake application. Therefore, the vehicle-deceleration, which had to be applied by the vehicle after the expiration of a driver reaction time, is continuously calculated in an evaluation device in order that a remaining distance to the vehicle traveling ahead can be maintained. If the absolute value of the calculated deceleration exceeds an assumed vehicle deceleration that can be generated by braking on the part of the driver, a collision warning signal is output. A system limit warning is output, if the absolute value of a deceleration, calculated with a driver reaction of zero, exceeds a deceleration that can be achieved by the ACC.

WO 2002/043029, and corresponding U.S. Pat. No. 7,002, 452 B2, both of which are incorporated herein by reference in entirety, relate to the detection of the vehicle running conditions of a vehicle ahead, the detection of the vehicle running conditions of a following vehicle, and the detection of the vehicle distance between the vehicle ahead and the following vehicle. The shortest distance between the following vehicle and the vehicle ahead is predicted based on the detected driving conditions of the vehicle ahead, the detected driving conditions of the following vehicle, and the detected vehicle distance. A proper vehicle distance is determined based on the vehicle distance between the vehicle ahead and the following vehicle. A warning or a braking force is generated, in case the predicted shortest distance is less than the predetermined proper vehicle distance.

A target deceleration necessary for maintaining the proper vehicle distance is determined. The speed and the deceleration of the vehicle ahead and the following vehicle are determined. The shortest distance between the following vehicle and the vehicle ahead is predicted based on the detected speed of the vehicle ahead, the detected deceleration of the vehicle ahead, the detected speed of the following vehicle, and the detected vehicle distance. Braking force is generated to make the detected deceleration of the following vehicle to match the calculated target deceleration, in case the predicted shortest distance becomes less than the predetermined proper vehicle distance.

WO 1999/042347, and corresponding U.S. Pat. No. 6,292, 753 B1, both of which are incorporated herein by reference in entirety, relate to a brake controller of a vehicle for avoiding a contact of the vehicle with the object, while the automatic operation of the brake shall not disturb the driver. Therefore, an object existing ahead of the vehicle in the direction of movement of the vehicle is detected. The possibility of a contact of the vehicle with the object is determined from the relative positional relationship between the vehicle and the object. A braking means carries out an automatic braking operation based on the result of the determination. A braking operation conducted by the driver is assisted by means of the braking means, in case the driver's braking will is detected during the automatic braking operation.

The driver's braking will is detected by at least on of depressing a brake pedal by the driver, the operation of returning an accelerator pedal by the driver, and the movement of a foot of the driver toward the brake pedal. Before starting of the automatic braking operation, a warning is output to the driver. Within a predetermined interval after the output of the warning, the driver's braking will is detected by at least one of depressing a brake pedal by the driver, the operation of returning an accelerator pedal by the driver, and the movement of a foot of the driver towards the brake pedal. The braking operation assistance for the driver is to maintain the braking force in the automatic braking operation before detection of the driver's braking will, or to increase the braking force in the automatic braking operation.

Critical situations of heavy goods or passenger vehicles should be detected more securely, the driver warned to this effect and/or the vehicle prepared to support the driver for an emergency braking process. Where possible, erroneous warnings and interventions should not occur.

BRIEF SUMMARY OF THE INVENTION

To achieve this feature, a method is proposed for detecting critical driving situations of motor vehicles, in particular for preventing collisions with an object located in front of the own vehicle. This method has the following steps:
Specification of an acceleration profile dependent on driving variables of the own vehicle;
Assumption of a time progression of a foreseeable acceleration of the own vehicle based on its current acceleration;
Determination of a path profile of the own vehicle from the time progression of the foreseeable acceleration;
Acquisition of a current distance and a current relative velocity of an object located in front of the own vehicle;
Assumption of a time progression of a foreseeable acceleration of the object based on its current acceleration;
Determination of a path profile of the object from the time progression of the foreseeable acceleration;

Comparison of the path profile of the own vehicle with the path profile of the object; and, if the two path profiles intersect, determination of a probable collision time of the own vehicle with the object;

Comparison of a time with the determined probable collision time of the own vehicle with the object; and, if the probable collision time is before this time, delivery of a warning to the driver of the own vehicle.

The determination of the path profile of the own vehicle from the time progression of the foreseeable acceleration can be achieved by Determining a velocity profile of the own vehicle by integration of the assumed acceleration profile; and/or Determining the path profile of the own vehicle by integration of the determined velocity profile.

The determination of the path profile of the object from the time progression of the foreseeable acceleration can be achieved by Determining a velocity profile of the object by integration of the assumed acceleration profile; and/or Determining the path profile of the object by integration of the determined velocity profile of the object.

The specification of an acceleration profile dependent on driving variables of the own vehicle can take account of an acquired or calculated current vehicle acceleration and/or an acquired or calculated current vehicle velocity of the own vehicle.

The assumption of a time progression of a foreseeable acceleration of the object in front can comprise calculation or determination of the current absolute velocity of the object and/or the absolute current acceleration of the object.

The comparison of the time with the determined probable collision time of the own vehicle with the object in front can comprise establishing a time before the probable collision time.

The assumption of a time progression of a foreseeable vehicle acceleration of the own vehicle for a predetermined period can take place based on the current vehicle acceleration of the own vehicle and/or from the time progression of the acceleration of the own vehicle during a period of predetermined length extending into the past.

The assumption of a time progression of a foreseeable acceleration profile dependent on driving variables of the own vehicle can take place depending on its current velocity, wherein the current vehicle acceleration is assigned to the acceleration profile as the starting value and the acceleration profile decreases slowly at high velocity and decreases quickly at low velocity.

The assumption of a time progression of a foreseeable vehicle acceleration of the object in front can take place for a predetermined period based on the current acceleration of the vehicle in front and if applicable from the time progression of the vehicle acceleration of the vehicle in front during a period of predetermined length extending into the past.

The assumption of a time progression of a foreseeable acceleration profile dependent on driving variables of the object in front can take place depending on its current velocity, wherein the current acceleration of the object is assigned to the acceleration profile as the starting value and the acceleration profile decreases slowly at high velocity and decreases quickly at low velocity.

When assuming the time progression of the foreseeable acceleration of the own vehicle, it can be distinguished whether its current acceleration is positive, zero or negative, and, if the current acceleration of the own vehicle is positive, then it is assumed for the time progression that the foreseeable vehicle acceleration decreases in the predetermined period, wherein preferably the time progression is adapted to the current driving situation, preferably to the current velocity of the own vehicle; if the current acceleration of the own vehicle is negative, then it is assumed that the foreseeable acceleration of the own vehicle in the predetermined period is constant; and if the current acceleration of the own vehicle is zero, then it is assumed that the foreseeable acceleration of the own vehicle in the predetermined period is constant.

When assuming the time progression of the foreseeable acceleration of the object in front, a distinction can be made, and if the current acceleration of the object is positive, then it is assumed for the time progression that the foreseeable acceleration of the object in front is constant in the predetermined period;

if the current acceleration of the object in front is negative, then it is assumed for the time progression that the foreseeable acceleration of the object in front decreases in the predetermined period, wherein preferably the time progression is adapted to the current driving situation, preferably to the current velocity of the object in front;

if the current vehicle acceleration of the object in front is zero, then it is assumed that the foreseeable acceleration of the object in front is constant in the predetermined period.

In addition or alternatively to the delivery of a warning to the driver of the own vehicle, an optical or acoustic warning, for example, can be emitted to following road users.

To avoid collisions with an object in front of an own vehicle, the following steps can be executed:

Specification of an acceleration profile dependent on driving variables of the own vehicle;

Assumption of a time progression of a foreseeable acceleration of the own vehicle based on its current acceleration;

Determination of a path profile of the own vehicle from the time progression of the foreseeable acceleration;

Acquisition of a current distance and a current relative velocity of an object located in front of the own vehicle;

Assumption of a time progression of a foreseeable acceleration of the object in front based on its current acceleration;

Determination of a path profile of the object from the time progression of the foreseeable acceleration;

Comparison of the path profile of the own vehicle with the path profile of the object in front; and if the two path profiles intersect or the velocity of the own vehicle coincides with that of the object at least within a tolerance band, determination of a probable collision time of the own vehicle with the object;

Comparison of a time with the determined probable collision time; and if the velocity of the own vehicle coincides with that of the object in front at least within a tolerance band, a residual distance of the own vehicle from the object and the velocity reduction up to the time are determined, and, if the velocity reduction falls below a value and the residual distance likewise falls below a value, driver-independent (emergency) braking is initiated.

The specification of an acceleration profile dependent on driving variables of the own vehicle can take account of an acquired or calculated current vehicle acceleration and/or an acquired or calculated current vehicle velocity of an own vehicle.

If the probable collision time is before the established time, the residual velocity of the own vehicle relative to the object in front at the probable collision time and the possible velocity reduction up to the probable collision time are determined.

The assumption of a time progression of a foreseeable acceleration of the object in front can comprise calculation or determination of the current absolute velocity of the object in front and/or the absolute current acceleration of the object.

The comparison of the time with the determined probable collision time of the own vehicle with the object in front comprises the establishment of a time before the probable collision time.

The assumption of a time progression of a foreseeable acceleration of the object for a predetermined period can take place based on its current acceleration and/or from the time progression of the vehicle acceleration of the object in front during a period of predetermined length extending into the past.

The assumption of a time progression of a foreseeable acceleration profile dependent on driving variables of the own vehicle can take place on the basis of a real system response of the own vehicle in the case of a specified emergency braking deceleration.

The path progressions for the own vehicle and the object in front are determined from the time progression of the acceleration of the object in front and of the own vehicle.

The examining of the two path profiles in relation to one another can comprise searching for a time at which either both path profiles have a common intersection or the own vehicle and the object in front are at a minimum distance from one another.

If an intersection of the two path profiles exists, (i) the time of the intersection, (ii) the residual path to collision and/or the residual velocity to the time of the potential collision, and (iii) the velocity reduction up to the time of the potential collision are determined, and if the path profiles do not intersect, but the own vehicle and the object in front are at a minimal distance from one another, (i) the residual distance between the own vehicle and the object in front at this time and/or (ii) the velocity reduction of the own vehicle up to this time are determined.

Determining a velocity reduction can take place on the basis of the times determined previously, wherein preferably the velocity reduction of the own vehicle is taken into account preferably on the basis of a real system response of the own vehicle in the event of an emergency braking request and the velocity reduction up to attainment of the residual distance at this time is determined by integration of the acceleration of the own vehicle between the integration limits t=0 and t=$T_{mindist}$.

In this case, falling below a specifiable minimum distance between the own vehicle and the object in front can be a first condition for initiation of a driver-independent emergency braking process, and/or a second condition for initiation of a driver-independent emergency braking process can be falling below a specifiable velocity reduction of the own vehicle up to the collision time t=$T_K$, at which the own vehicle collides with the object in front.

A time for a warning or other collision-preparatory measures can be established sooner or later depending on driver activities, the current driving scenario and current environmental conditions.

In addition or alternatively to the delivery of a warning to the driver of the own vehicle, an optical and/or acoustic warning can be issued to following road users.

The method details explained here are shown in combination. Reference should be made to the fact, however, that they are also independent of one another and can also be freely combined with one another. The sequences shown in the figures should be understood to be not restrictive, but illustrative. Individual sub-steps can also be executed differently from the order shown and can also deviate from those shown. Other advantages of this invention will become apparent to those skilled in the art from the following detailed description of the preferred embodiments, when read in light of the accompanying drawings.

BRIEF DESCRIPTION OF THE DRAWINGS

FIG. 8 illustrates schematically the modular structure for the functional connection between determination of the driver warning and a subsequent necessity to be established, on expiry of the warning time duration, for emergency braking and its subsequent triggering.

FIG. 9 illustrates schematically the situation of a vehicle in front of the own vehicle and the data to be ascertained by means of a radar sensor on the own vehicle in this situation.

DETAILED DESCRIPTION OF THE INVENTION

As FIG. 9 illustrates, the situation of a vehicle in front of the own vehicle is detected by means of a radar sensor; the absolute velocity of the vehicle in front can thus be determined from the relative velocity of the vehicle in front and the absolute velocity of the own vehicle detected by means of wheel speed sensors of the own vehicle. The radar sensor also supplies the distance between the vehicle in front and the own vehicle. Furthermore, the acceleration of the vehicle in front can also be determined from these data.

FIG. 8 shows how, in the method described here, the two functions "determination of the necessity for a driver warning" and "establishing the necessity of emergency braking" can be configured in modular form and can be executed one after another. In this case, "establishing the necessity of emergency braking" and its subsequent triggering can also be omitted; conversely, the method presented here also makes it possible not to execute the "determination of the necessity for a driver warning" and to execute directly in the manner illustrated the steps for "establishing the necessity of emergency braking" and its subsequent triggering.

Figure 1:
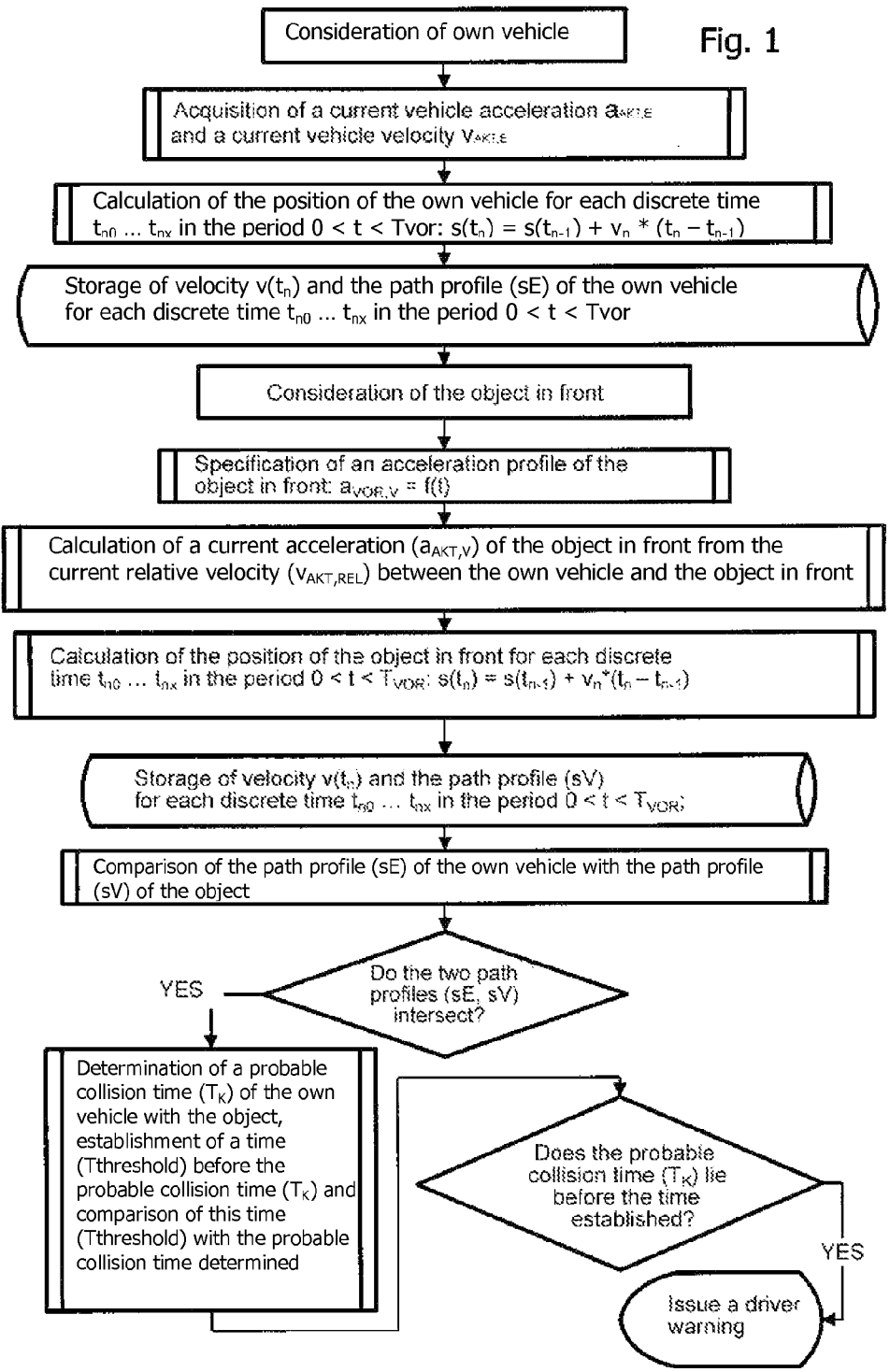
FIG. 1 shows an overview flow chart of a method for detecting critical driving situations of lorries or passenger vehicles for preventing (rear-end) collisions between the own vehicle and a vehicle or object in front of the own vehicle.
Figure 2:
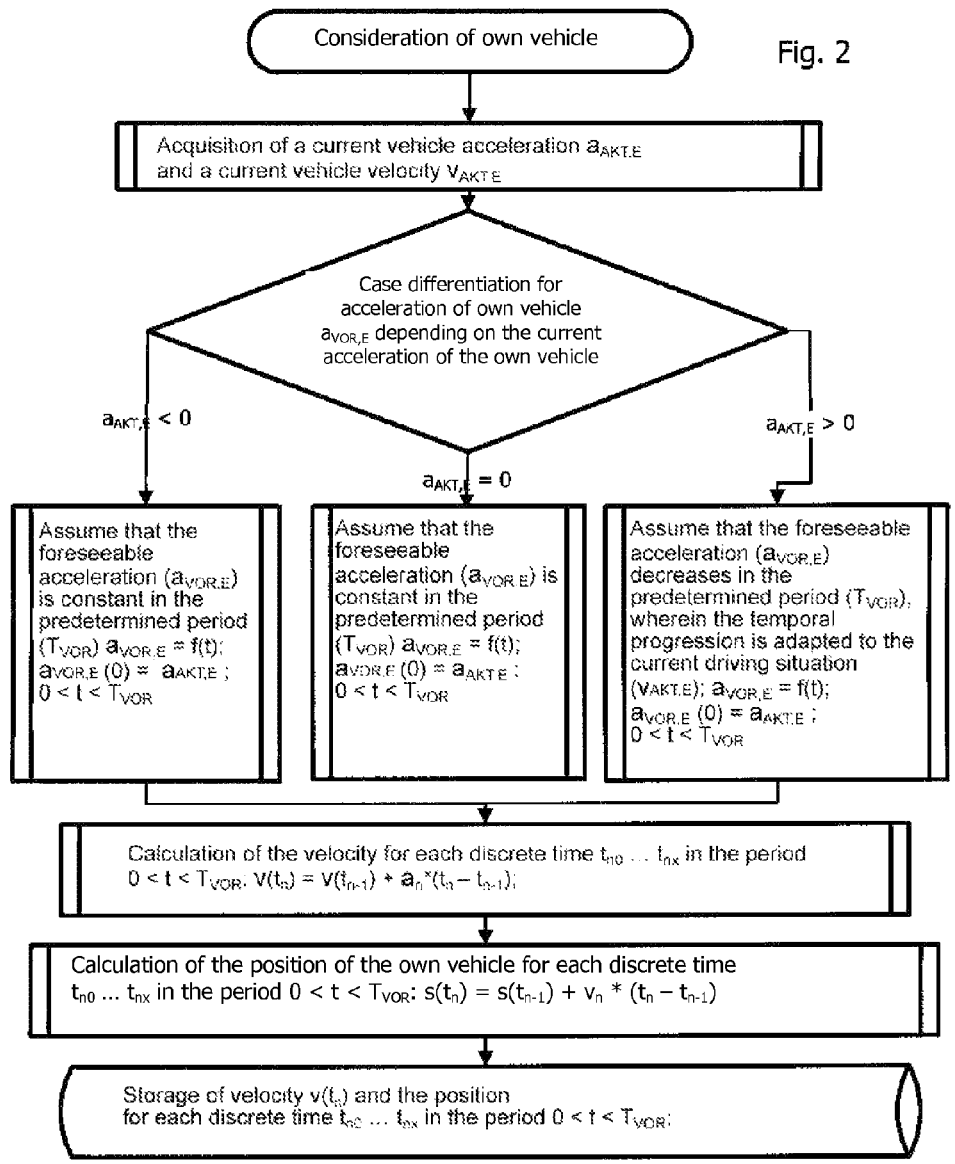
FIG. 2 shows a flow chart of a partial aspect of the method according to FIG. 1, in which the own vehicle is considered.
Figure 3:
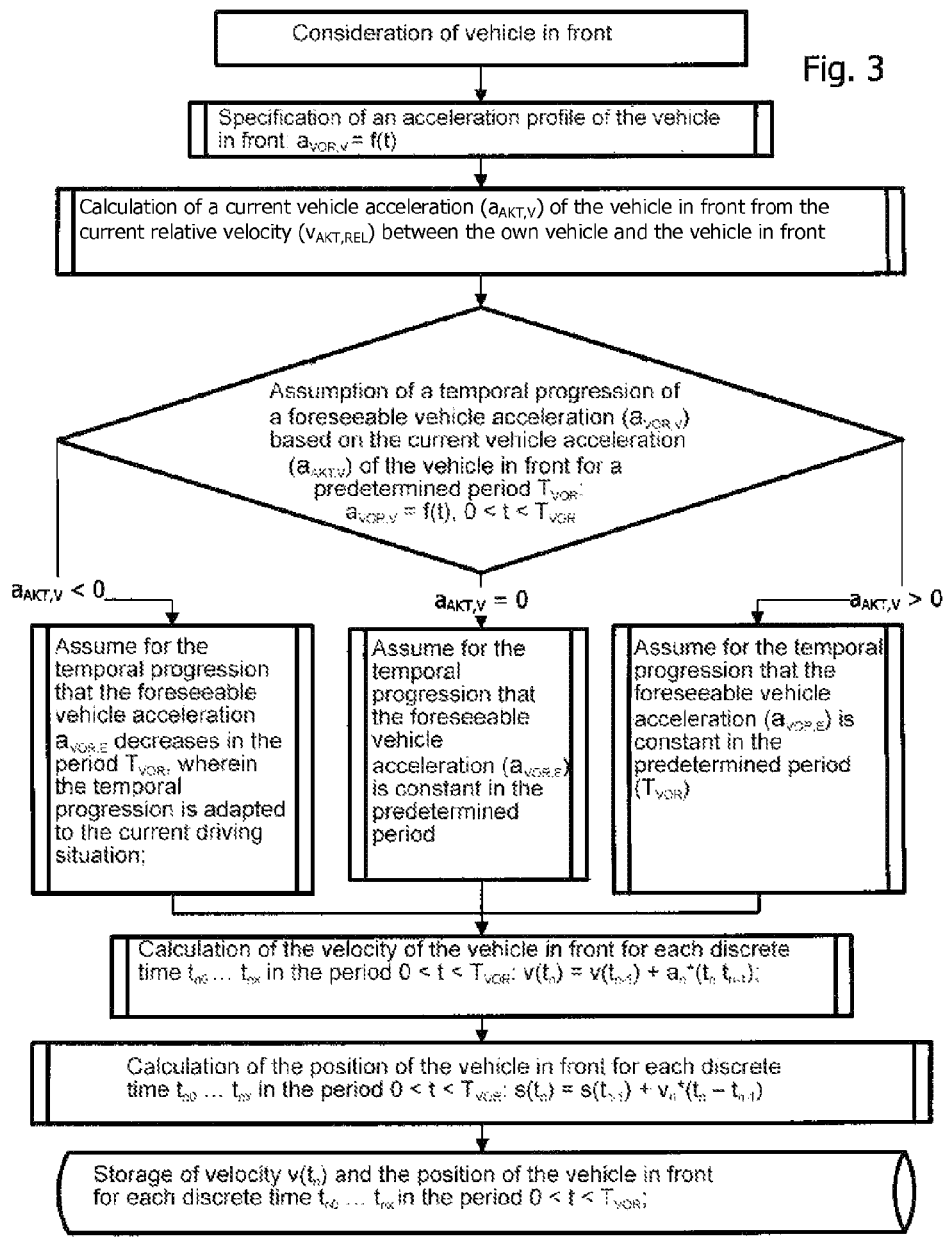
FIG. 3 shows a flow chart of a partial aspect of the method according to FIG. 1, in which the vehicle or object in front of the own vehicle is considered.
Figure 4:
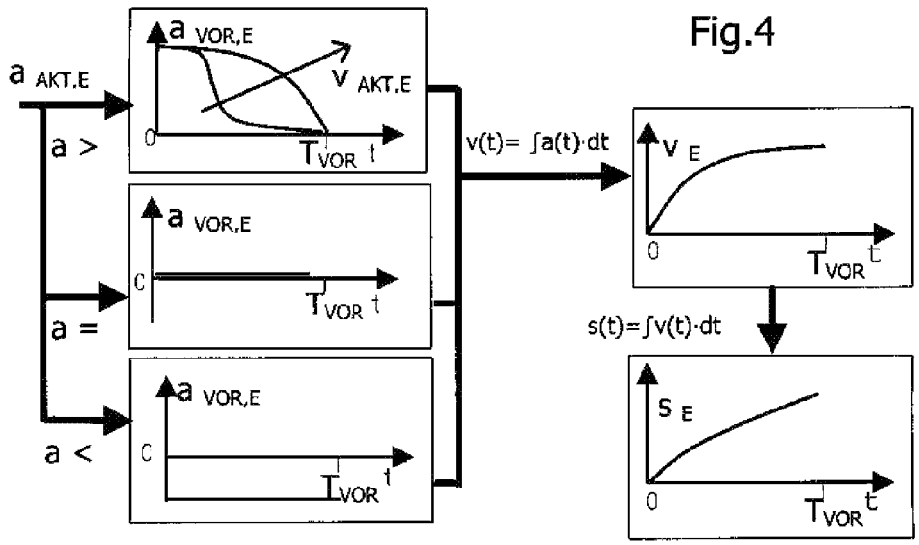
FIG. 4 shows a schematic diagram of the sequences of the method according to FIG. 2, in which the own vehicle is considered.
Figure 5:
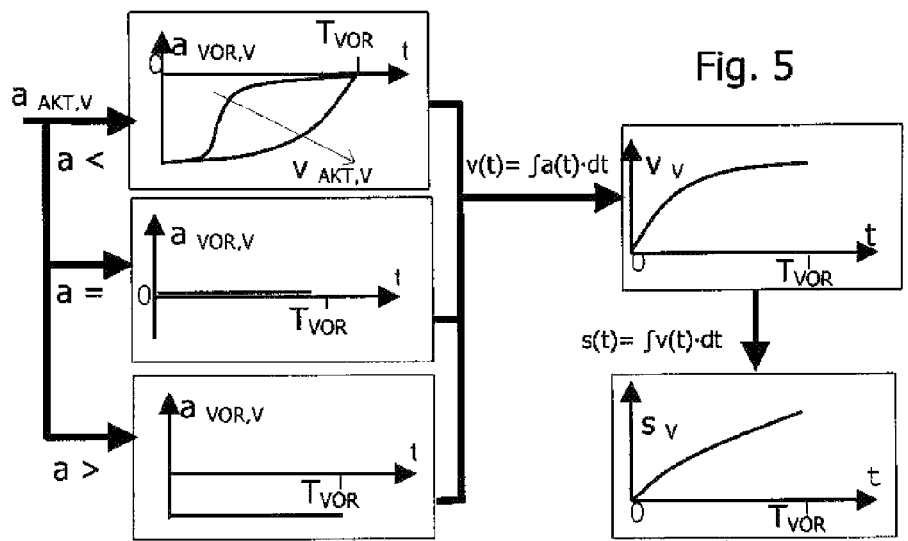
FIG. 5 shows a schematic diagram of the sequences of the method according to FIG. 3, in which the vehicle or object in front of the own vehicle is considered.
Figure 5:
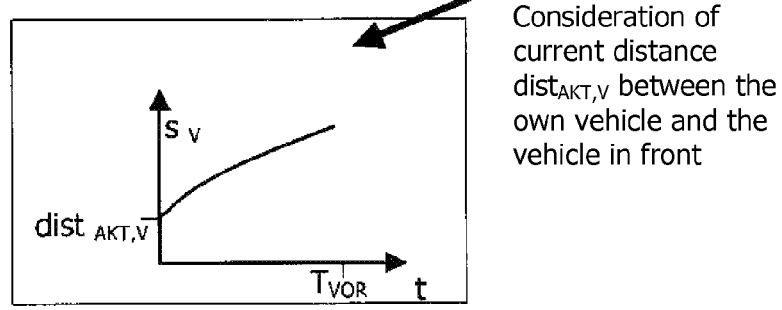
Figure 6:
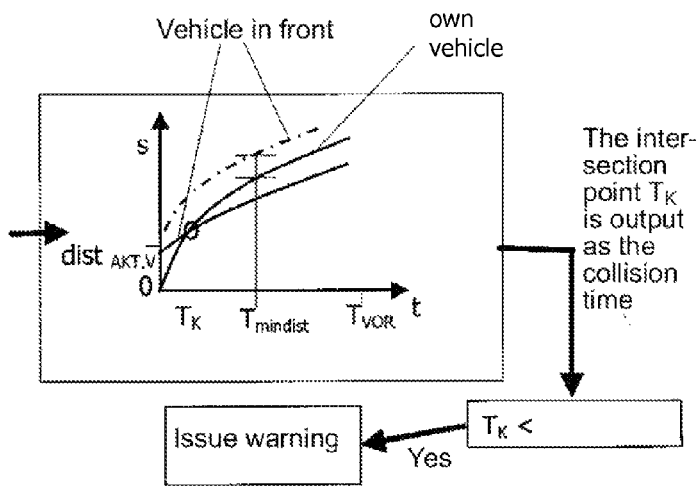
FIG. 6 shows a schematic diagram of the sequences of the method in order to determine whether a warning is delivered to the driver of the own vehicle.

In a first phase of the method, the own vehicle is considered (FIG. 1, 2, 4). Here as a first step a current vehicle acceleration $a_{AKT,E}$ and a current vehicle velocity $v_{AKT,E}$ are acquired or determined, for example directly using a longitudinal acceleration sensor or indirectly by calculation of data from wheel speed sensors.

As a next step in this first phase, a temporally variable acceleration profile is assumed $a_{VOR,E}$=f(t), wherein the current vehicle acceleration $a_{AKT,E}$ is used as the starting value (f(0)). Depending on the current vehicle velocity $v_{AKT,E}$ and/or the driving environment (for example town, rural road, motorway etc.), the acceleration profile is modified: at high velocity (motorway) the specified acceleration profile decreases slowly; at low velocity (urban traffic) the specified acceleration profile decreases quickly.

When assuming the time progression of a foreseeable vehicle acceleration of the own vehicle $a_{VOR,E}$ for a predetermined period $T_{VOR}$ based on the current vehicle acceleration of the own vehicle $a_{AKT,E}$ and if applicable from the time progression of the vehicle acceleration of the own vehicle during a period of predetermined length extending into the past $a_{VOR,E}$=f(t); $0 \leq t \leq T_{VOR}$, three cases are distinguished: is the current vehicle acceleration of the own vehicle $a_{AKT,E}$ positive, zero or negative?

If the current vehicle acceleration of the own vehicle is positive $a_{AKT,E}>0$, thus if the own vehicle is accelerating, then it is assumed for the time progression that the foreseeable vehicle acceleration of the own vehicle $a_{VOR,E}$ decreases in the predetermined period $T_{VOR}$, wherein the time progression is adapted to the current driving situation, e.g. the current vehicle velocity of the own vehicle $v_{AKT,E}$.

If the current vehicle velocity of the own vehicle is negative $a_{AKT,E}<0$, thus if the own vehicle is decelerating, then it is assumed that the foreseeable vehicle acceleration of the own vehicle $a_{VOR,E}$ is constant in the predetermined period $T_{VOR}$.

If the current vehicle acceleration of the own vehicle is zero $a_{AKT,E}=0$, thus if the own vehicle is driving at a constant velocity, then it is assumed that the foreseeable vehicle acceleration of the own vehicle $a_{VOR,E}$ is constant (equal to zero) in the predetermined period.

The two latter cases ($a_{AKT,E}<0$ and $a_{AKT,E}=0$) can also be checked together and it can be assumed jointly for both cases that the foreseeable vehicle acceleration of the own vehicle $a_{VOR,E}$ is constant in the predetermined period.

In a further step in the first phase, the velocity profile of the own vehicle $v_E$=f(t) is determined preferably by stepwise integration of the assumed acceleration profile $a_{VOR,E}$, wherein the current vehicle velocity $v_{AKT,E}$ is used as the starting value f(0)=$v_E$(0). Calculation of the velocity can thus be carried out for example for each discrete time $t_{n0} \ldots t_{nx}$ in the period $0 \leq t \leq T_{VOR}$ according to the formula: $v(t_n)=v(t_{n-1})+a_n*(t_n-t_{n-1})$. There then follows in this first phase the determination of the path profile of the own vehicle: $s_E$=f(t) by stepwise integration of the assumed velocity profile $v_E$, wherein $s_E(0)=0$. The position of the own vehicle for each discrete time $t_{n0} \ldots t_{nx}$ in the period $0 \leq t \leq T_{VOR}$ can thus be calculated using the formula: $s(t_n)=s(t_{n-1})+v_n*(t_n-t_{n-1})$.

In a second phase of the method, a vehicle in front or an object in front of the own vehicle is considered (FIG. 1, 3, 5). Here "object" or "vehicle in front" is always taken to mean both a vehicle driving in front relative to the own vehicle or an object located in front of the own vehicle that can also be stationary.

In a first step in the second phase, acquisition of a current distance $dist_{AKT,V}$ and a current relative velocity $vrel_{AKT,V}$ between the own vehicle and the object takes place, for example using a radar sensor.

In a second step in the second phase, calculation of the absolute velocity of the object from the current relative velocity ($vrel_{AKT,V}$) of the object and the current vehicle velocity ($v_{AKT,E}$) of the own vehicle takes place ($v_{AKT,E}$) as well as calculation of the absolute acceleration of the object from the velocity progression of the current absolute velocity of the object by stepwise differentiation according to time.

Then a temporally variable acceleration profile is specified for the object: $a_{VOR,V}$=f(t); f(0)=current acceleration ($a_{AKT,V}$). Depending on the current velocity $v_{AKT,V}$ and/or the driving environment (town, rural road, motorway etc.), the acceleration profile is modified (at high velocity (motorway) the specified acceleration profile decreases slowly; at low velocity (urban traffic) the specified acceleration profile decreases quickly). To do this, a time progression of a foreseeable acceleration of the object ($a_{VOR,V}$) for a predetermined period ($T_{VOR}$) is assumed based on the current acceleration of the object ($a_{AKT,V}$) and if applicable from the time progression of the acceleration of the object during a period of predetermined length extending into the past $a_{VOR,V}$=f(t); $0 \leq t \leq T_{VOR}$.

When assuming the time progression of the foreseeable acceleration of the object $a_{VOR,V}$ whether the current acceleration of the object $a_{AKT,E}$ three cases are distinguished: is the current acceleration of the object $a_{AKT,E}$ positive, zero or negative?

If the current acceleration of the object is positive ($a_{AKT,V}>0$), thus if the object is accelerating, then it is assumed for the time progression that the foreseeable acceleration of the object ($a_{VOR,V}$) in the predetermined period ($T_{VOR}$) is constant.

If the current acceleration of the object is negative ($a_{AKT,V}<0$), thus if the object is decelerating, then it is assumed that the foreseeable acceleration of the object ($a_{VOR,V}$) in the predetermined period ($T_{VOR}$) decreases, wherein the time progression is adapted to the current driving situation, e.g. the current velocity of the object ($v_{AKT,V}$).

If the current acceleration of the object is zero ($a_{AKT,V}=0$), thus if the object is driving at a constant velocity, then it is assumed that the foreseeable acceleration of the object ($a_{VOR,V}$) in the predetermined period ($T_{VOR}$) is constant.

The two latter cases ($a_{AKT,V}<0$ and $a_{AKT,V}=0$) can also be checked together and it can be assumed jointly for both cases that the foreseeable vehicle acceleration of the object $a_{VOR,V}$ in the predetermined period is constant.

In a further step in the second phase, determination of the velocity profile of the object $v_V$=f(t) takes place by stepwise integration of the assumed acceleration profile ($a_{VOR,V}$), wherein the current vehicle velocity $v_{AKT,V}$ is used as the starting value f(0)=$v_V(0)$=$v_{AKT,V}$.

Calculation of the velocity can be carried out for each discrete time $t_{n0} \ldots t_{nx}$ in the period $0 \leq t \leq T_{VOR}$ according to the formula: $v(t_n)=v(t_{n-1})+a_n*(t_n-t_{n-1})$.

Finally, determination of the path profile of the object $s_V$=f(t) follows by stepwise integration of the assumed acceleration profile ($a_{VOR,V}$), wherein the current distance between the own vehicle and the object is used as the starting value f(0)=$s_V(0)$=$dist_{AKT,V}$. The position of the vehicle in front can be calculated for each discrete time $t_{n0} \ldots t_{nx}$ in the period $0 \leq t \leq T_{VOR}$ according to the formula: $s(t_n)=s(t_{n-1})+v_n*(t_n-t_{n-1})$.

In a third phase of the method, an examination of critical driving situations takes place (FIG. 1, 6, 7).

The assumption of a time progression of a foreseeable acceleration of the object in front for a predetermined period can take place based on its current acceleration and if applicable from the time progression of the acceleration of the object in front during a period of predetermined length extending into the past.

The assumption of a time progression of a foreseeable acceleration profile dependent on driving variables of the own vehicle can take place on the basis of a real system response of the own vehicle in the case of a specified emergency braking deceleration. This real system response could be stored as a vehicle-dependent set of characteristic curves.

Based on the acceleration profile of the vehicle in front as well as of the object in front, the path progressions for the own vehicle and the object in front are determined in a first step.

To do this, in a first step in the third phase, the path profile of the own vehicle is compared for each discrete time ($t_{n0} \ldots t_{nx}$) in the period ($0 \leq t \leq T_{VOR}$) with the path profile of the object. If the two path profiles intersect, this signifies a potential collision of the own vehicle with the object in front under the assumptions made previously. In this case, a probable collision time (TK) of the own vehicle with the object in front is determined from the intersection of the two path profiles. Thereupon a comparison is made of this time before the potential collision with the calculated probable collision time. If the probable collision time ($T_K$) is before the established time, a warning is issued and/or other collision-preparatory measures are taken.

Figure 7:
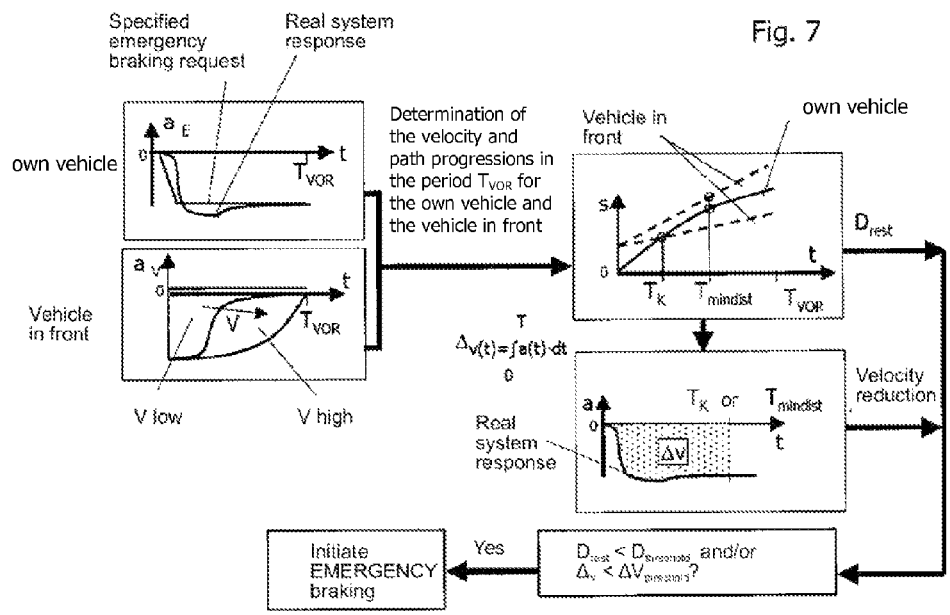
FIG. 7 shows a schematic diagram of the sequences of the method in order to determine whether driver-independent emergency braking of the own vehicle is initiated. Here two conditions can be taken into account for the initiation of emergency braking: a residual distance of the own vehicle from the object and/or a velocity reduction up to a collision or minimal distance time.

The examining of the two path profiles in relation to one another can have as the aim the searching of a time T at which both path profiles have a common intersection point. An intersection of the two path profiles signifies a potential collision of the own vehicle with the object in front at time $T_K$ under the assumptions made previously (in the top right diagram in FIG. 7, this is the intersection point between the lower continuous line (own vehicle) and the dashed line (vehicle in front) at time $T_K$). The examining of the two path profiles can likewise have the aim of determining a minimum residual distance $D_{rest}$ between the own vehicle and the object in front at time $T_{mindist}$ under the assumptions made previously (in the top right diagram in FIG. 7, this is the intersection point between the continuous line (own vehicle) and the upper dashed line (vehicle in front) at time $T_{mindist}$).

The examining of the two path profiles in relation to one another can comprise the searching of a time at which either both path profiles have a common intersection point or the own vehicle and the vehicle in front coincide a minimum distance $D_{rest}$. An intersection of the two path profiles signifies a potential collision of the own vehicle with the object in front under the assumptions made previously. In the case that such an intersection exists, the following are determined: (i) the time $T_K$ of the intersection (thus of the potential collision), (ii) the residual path up to the collision, and/or the residual velocity at the time of the potential collision, and (iii) the reduction in velocity $\Delta_V$ up to the time of the potential collision. In the other case (i.e. the path profiles do not intersect, but the own vehicle and the vehicle in front have a minimum distance $D_{rest}$ from one another), the following are determined: (i) the residual distance $D_{rest}$ between the own vehicle and the vehicle in front at this time $T_{mindist}$ and/or (ii) the reduction in velocity $A_V$ of the own vehicle up to the time $T_{mindist}$.

In a second step, determining of a reduction in velocity can take place on the basis of the times established previously. An assumption of the velocity reduction $\Delta_V$ of the own vehicle can be made on the basis of the real system response of the own vehicle by time integration according to $\Delta_V = \int a(t) \cdot dt$. Here a(t) is the progression of the real system response of the own vehicle in the event of an emergency braking request (see FIG. 7, top left diagram). The braking process begins at time t=0. In a collision of the own vehicle with the vehicle in front at time t=$T_K$, the velocity reduction of the own vehicle up to collision can be determined from the integration between the integration limits t=0 and t=$T_K$.

A velocity reduction ΔV up to attainment of the residual distance $D_{rest}$ at time $T_{mindist}$ can be determined from the integration of $\Delta V = \int a(t) \cdot dt$ between the integration limits t=0 and t=$T_{mindist}$.

A first condition for initiating a driver-independent emergency braking process can be falling below a specifiable minimum distance $D_{threshold}$ between the own vehicle and the object in front. This means that an emergency braking process could be initiated under the condition $D_{rest} < D_{threshold}$.

A second condition for initiating an emergency braking process can be falling below a specifiable velocity reduction $\Delta V_{threshold}$ of the own vehicle up to the collision time t=$T_K$, at which the own vehicle collides with the object in front. This means that a driver-independent emergency braking process could be initiated if the condition $\Delta V < \Delta V_{threshold}$ is fulfilled.

A driver-independent emergency braking process can be initiated on fulfilment of the first condition or on fulfilment of the second condition. Such a driver-independent emergency braking process can also be initiated if the first and second condition are fulfilled. In other words, if the velocity reduction $\Delta_V$ of the own vehicle falls below a specifiable threshold value and/or the residual distance $D_{rest}$ between the own vehicle and object in front at this time $T_{mindist}$ likewise falls below a specifiable threshold value or is zero, a driver-independent emergency braking process is initiated.

The time for a warning or other collision-preparatory measures can be fixed sooner or later depending on driver activities such as actuating indicators, for example, steering wheel activity, actuating the accelerator pedal, brake pedal, actuating the gear lever, etc., telephone activity, current driving situation, the current driving scenario and current environmental conditions such as weather conditions, for example, detected by windscreen wiper activity, rear fog light, rain sensor. In addition or alternatively to the delivery of a warning to the driver of the own vehicle, an optical warning, for example, can be issued to the following road user(s) (at the beginning of or only during the warning time duration). To do this, the hazard warning lights can be activated and/or the brake lights activated (also intermittently).

A critical situation and a suitable time for activating braking to avoid a collision or at least to reduce its consequences can be detected earlier in this way.

In particular, a critical situation can be detected and the suitable time determined at which a braking intervention of the vehicle brake system leads to having reached a specified velocity reduction at the time of the collision. Alternatively to this, the suitable time for a braking intervention of the vehicle brake system can be determined in order to have a specified residual distance at the time of identical velocity of the vehicle in front and the own vehicle. Erroneous or unnecessary braking interventions should only seldom occur in this case.

The threshold for the velocity reduction and the residual distance can also be established depending on the above-mentioned criteria (driver activity, current driving situation, the current driving scenario and current environmental conditions).

The automatic (emergency) braking is terminated or cancelled if the current relative velocity between the own vehicle and the object in front is zero, if a minimum distance is present between them, and/or the specified velocity reduction up to the time was exceeded (or the collision has occurred). In this case it is also taken into account, especially when considering the specified velocity reduction, that following ending of the braking intervention, the deceleration present at this time does not fall away directly if the braking intervention is ended. In other words, the real driving behaviour following the end of the braking intervention can be included.

The brake equipment of the own vehicle can be brought into the braking position before the automatic emergency braking process (prefilling of the brakes, light application of the brake pads to the brake discs etc.) In this case the own vehicle can also be already slightly braked. This can happen in a form perceptible to the driver, and so already be at least a part of the driver warning. This preparatory braking is less than the actual emergency braking.

If the driver of the own vehicle is warned in an optically and/or acoustically and/or haptically perceptible manner (e.g. vibration of the steering wheel), his attention is drawn unmistakably to the fact that the risk exists of colliding with the vehicle in front and on expiry of the specified warning time duration the automatic emergency braking process is triggered, therefore.

The automatic emergency braking process can be triggered if a specified emergency braking condition is fulfilled and the specified warning time duration has expired. The emergency braking deceleration or a variable related thereto, such as the emergency braking pressure, the emergency braking force or the emergency braking torque, can be specified either fixedly or adjustably. In the latter case, depending on variables that describe for example the vehicle mass, the pad friction coefficient of the wheel brake devices of the vehicle, the nature of the carriageway or the visibility conditions, the possibility exists of determining for example an actually attainable maximum braking deceleration and of setting the value of the specified emergency braking deceleration according to the determined actually attainable maximum braking deceleration.

Instead of this, the value of the emergency braking deceleration can also be specified fixedly. In this case preferably an averagely attainable maximum braking deceleration is assumed, the value of which typically lies in the range between $3 \text{ m/s}^2$ and $8 \text{ m/s}^2$.

The same applies to specification of the warning time duration, which can likewise be given fixedly or adjustably. A fixedly specified warning time duration has the advantage that the time of triggering of the automatic emergency braking process is known to the driver and this does not occur unexpectedly or unforeseeably. A suitable value of the specified warning time duration can be determined on the basis of driving trials. This lies typically in the range between 1.5 and 2.5 seconds. On the other hand, it is conceivable to set the value of the specified warning time duration depending on variables that describe e.g. the vehicle mass, the pad friction coefficient of the wheel brake devices of the own vehicle, the nature of the carriageway or the visibility conditions. In this case, preferably a minimum value of the warning time duration is specified, below which the duration should not fall, so that the driver is left sufficient time in principle to prepare himself for triggering of the automatic emergency braking process or to intervene himself beforehand.

The relative velocity of the object in front in relation to the own vehicle can also be specified either fixedly or adjustably. Here it is advantageous if the value of a fixedly specified target relative velocity is roughly zero. In this case, the intrinsic velocity of the vehicle is only reduced by the automatic emergency braking process to the extent that is absolutely necessary to reliably prevent a collision between the own vehicle and the object in front. Any reduction in the intrinsic velocity going beyond this is unnecessary and represents an additional risk for following vehicles in particular.

Furthermore, the safety distance from the object in front can also be specified fixedly or adjustably. The value of the safety distance can be set either depending on variables that describe for example the vehicle mass, the pad friction coefficient of the wheel brake devices of the own vehicle, the nature of the carriageway, the vehicle velocity or the visibility conditions, or manually by the driver of the own vehicle. Here a minimum value is preferably specified for the safety distance, so that tailgating the object in front on termination of the emergency braking process is prevented. For the sake of simplicity, the default safety distance value can also be specified fixedly. This then lies typically between zero and several meters.

Advantageously, if driver activity exists and/or if the collision risk is reduced, a driver warning is not triggered and/or the intensity of the driver warning is adapted. This avoids the driver of the vehicle finding unnecessarily triggered driver warnings distracting and switching the device off in the long term, so that the method is not executed.

Furthermore, if driver activity exists and/or if the collision risk is reduced, a driver warning that has already been triggered can be terminated and/or changed and/or triggering of the automatic emergency braking process can be stopped.

On the one hand, the driver of the own vehicle is given the opportunity for as long as possible to take suitable countermeasures to prevent a collision with the vehicle in front, and on the other hand a driver warning that has become unnecessary in the meantime is not maintained further and/or an automatic emergency braking process that has become unnecessary in the meantime is not even triggered.

The automatic emergency braking process can be triggered automatically on expiry of the specified warning time duration if the driver warning is not cancelled during the specified warning time duration. The time of triggering of the automatic emergency braking process is thus known to the driver of the own vehicle, and he has the opportunity to take suitable countermeasures to prevent a collision with the object in front.

In order not to jeopardize the success of an already triggered automatic emergency braking process by premature cancellation on the part of the driver, this is only cancelled if an established emergency braking duration has expired and/or if the specified target relative velocity and the specified safety distance have been reached. The emergency braking duration depends on the momentary driving situation when the automatic emergency braking process is triggered, the specified emergency braking deceleration, the relative velocity and the safety distance between the own vehicle and the object in front.

The driver warning advantageously consists of at least two warning stages, which are triggered consecutively in time within the specified warning time duration of the driver warning, wherein each warning stage is assigned a specified warning stage duration. It is thus possible to build up the driver warning by using warning stages of differing urgency, wherein the urgency of the warning stages can increase as the time remaining up to triggering of the automatic emergency braking process decreases, so that the driver is made aware of the diminishing time span up to triggering of the automatic emergency braking process.

The warning stage duration of a warning stage can be specified fixedly or adjustably. A fixedly specified warning stage duration has the advantage that the time of triggering of any following warning stage and/or of the automatic emergency braking process is known to the driver and does not occur unexpectedly or unforeseeably.

In addition, the possibility exists of setting the value of the warning stage duration of a warning stage depending on variables that describe for example the vehicle mass, the pad friction coefficient of the wheel brake devices of the own vehicle, the visibility conditions or the nature of the carriageway. Therefore, the last and thus normally the most urgent warning stage can for example be triggered the sooner the more unfavourable the conditions are for preventing a collision by triggering the automatic emergency braking process.

Furthermore, the possibility exists, following triggering of a first warning stage, of only triggering at least one further warning stage if a specified warning condition assigned respectively to the further warning stage is met. The necessity of triggering each further warning stage can be checked, therefore, and the triggering of unnecessary warning stages disproportionate to the actual collision risk avoided.

If driver activity exists and/or the collision risk is reduced, at least one of the warning stages already triggered can be terminated and/or the triggering of further warning stages stopped. This avoids the driver of the vehicle finding unnecessarily triggered warning stages distracting and deactivating the device.

It is also possible here to maintain a warning stage already triggered, which exists e.g. in the form of an optical driver warning, up to expiry of the specified warning time duration and only not trigger further warning stages to alert the driver to the collision risk potentially existing.

The presence of driver activity is expediently detected based on an actuation of at least one of the operating elements of the vehicle, wherein the operating element serves in particular to change the longitudinal or transverse dynamics of the vehicle.

The operating elements that are suitable for detection of driver activity include for example the accelerator pedal, the brake pedal, the clutch pedal, the steering wheel or the vehicle direction indicators.

A reduction in the collision risk can be detected simply with reference to a distance increasing with time between the vehicle and the vehicle in front and/or a relative velocity decreasing with time between the own vehicle and the object in front.

To be able to detect reliably and estimate correctly the risk of collision between the vehicle and the vehicle in front even in complex traffic situations, the momentary driving situation of the vehicle is determined depending on the distance determined between the own vehicle and the object in front and/or the velocity of the vehicle determined and/or the relative velocity determined between the own vehicle and the object in front and/or the acceleration of the vehicle determined and/or the carriageway inclination and/or friction coefficients between the carriageway and the vehicle wheels.

So that the risk of possible consequential accidents is reduced, a warning to vehicles in front and/or behind can be given when the automatic emergency braking process is triggered. To do this, the brake lights, the vehicle horn, the hazard lights or the dipped or full headlight of the vehicle are used, for example.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method for preventing collisions with an object in front of an own vehicle having at least one sensor and a brake, with the following steps:
specifying an acceleration profile depending on driving variables of the own vehicle;
assuming a time progression of a foreseeable acceleration of the own vehicle based on a current acceleration of the own vehicle;
determining a path profile of the own vehicle from the time progression of the foreseeable acceleration;
acquiring with the at least one sensor a current distance and a current relative velocity of an object in front of the own vehicle;
assuming a time progression of a foreseeable acceleration of the object in front based on a current acceleration of the object in front;
determining a path profile of the object in front from the time progression of the foreseeable acceleration;
comparing the path profile of the own vehicle with the path profile of the object in front; and
if the two path profiles intersect or the velocity of the own vehicle coincides with that of the object in front at least within a tolerance band, determining a probable collision time of the own vehicle with the object in front,
comparing a time with the probable collision time established; and
if the velocity of the own vehicle coincides with that of the object in front at least within a tolerance band, a residual distance of the own vehicle from the object in front and a reduction in velocity up to the time are determined, and
if the velocity reduction falls below a value and the residual distance likewise falls below a value, initiating driver-independent emergency braking of the brake.

2. The method according to the claim 1, in which specifying an acceleration profile dependent on driving variables of the own vehicle takes account of an acquired or calculated current vehicle acceleration and/or an acquired or calculated current vehicle velocity of the own vehicle.

3. The method according to claim 1, in which, if the probable collision time lies before the established time, determining the residual velocity of the own vehicle relative to the object in front at the probable collision time and the possible velocity reduction up to the probable collision time.

4. The method according to claim 1, in which assuming a time progression of a foreseeable acceleration of the object in front comprises calculation or determination of a current absolute velocity of the object in front and/or an absolute current acceleration of the object in front.

5. The method according to claim 1, in which comparing the time with the probable collision time determined of the own vehicle with the object in front comprises establishment of a time before the probable collision time.

6. The method according to claim 1, in which assuming a time progression of a foreseeable acceleration of the object in front for a predetermined period takes place based on a current acceleration of the object in front and/or from the time progression of the vehicle acceleration of the object in front during a period of predetermined length extending into the past.

7. The method according to claim 1, in which assuming a time progression of a foreseeable acceleration profile depending on driving variables of the own vehicle takes place on the basis of a real system response of the own vehicle in the case of a specified emergency braking deceleration.

8. The method according to claim 1, in which the path progressions for the own vehicle and the object in front are determined from the time progression of the acceleration of the object in front as well as of the own vehicle.

9. The method according to claim 1, in which comparing the two path profiles in relation to one another comprises searching for a time at which either both path profiles have a common intersection point or the own vehicle and the object in front have a minimum distance from one another.

10. The method according to claim 9, in which, if an intersection of the two path profiles is present, determining (i) the time of the intersection, (ii) the residual path up to collision and/or the residual velocity at the time of the potential collision, and (iii) the velocity reduction up to the time of the potential collision, and if the path profiles do not intersect, but the own vehicle and the object in front have a minimal distance from one another, determining (i) the residual distance between the own vehicle and object in front at this time and/or (ii) the velocity reduction of the own vehicle up to the time.

11. The method according to claim 10, in which determining a velocity reduction takes place on the basis of the times determined previously, and wherein the velocity reduction of the own vehicle takes account of a real system response of the own vehicle in the event of an emergency braking request and the velocity reduction up to attainment of the residual distance from one another at the time is determined by integration of the acceleration of the own vehicle between the integration limits $t=0$ and $t=T_{mindist}$.

12. The method according to claim 1, in which a first condition for initiation of a driver-independent emergency braking process is falling below a specifiable minimum distance between the own vehicle and the object in front, and/or in which a second condition for initiation of an emergency braking process is falling below a specifiable velocity reduction of the own vehicle up to the collision time, at which the own vehicle collides with the object in front.

13. The method according to claim 1, in which a time for a warning or other collision-preparatory measures is established sooner or later depending on driver activities, the current driving scenario and current environmental conditions.

14. The method according to claim 1, further comprising the step of issuing an optical and/or acoustic warning to following road users with a warning device of the own vehicle.

15. The method according to claim 1, wherein the at least one sensor is a radar sensor.

16. The method according to claim 1, wherein the at least one sensor is a wheel speed sensor.

* * * * *